United States Patent

Budrys et al.

[15] 3,692,946

[45] Sept. 19, 1972

[54] SPECIAL SERVICE ROUTING

[72] Inventors: Ignas Budrys; Ernest O. Lee, Jr., both of Fairport, N.Y.

[73] Assignee: Stromberg-Carlson Corporation, Rochester, N.Y.

[22] Filed: Dec. 10, 1970

[21] Appl. No.: 96,930

[52] U.S. Cl. ..............................................179/18 BA

[51] Int. Cl. ..............................................H04m 3/44

[58] Field of Search.........................179/18 B, 18 BA

[56] References Cited

FOREIGN PATENTS OR APPLICATIONS 1,171,984 11/1969 Great Britain ...........179/18 B

*Primary Examiner*—William C. Cooper

*Attorney*—Craig, Antonelli, Stewart & Hill

[57] ABSTRACT

A special service routing circuit provides for single digit access to service centers in a complex of buildings or a large multi-storied building, such as a motel or hotel, in such a way that particular centers can be accessed only by particular lines in accordance with their location. The routing circuit generates three digits to accompany the single dialed digit, which three digits will have a value depending on the location of the calling party for access to certain service lines.

10 Claims, 7 Drawing Figures

FIG I

INVENTORS
ERNEST O. LEE, JR.
IGNAS BUDRYS

BY Craig, Antonelli, Stewart & Hill

ATTORNEYS

SPECIAL SERVICE ROUTING

The present invention relates in general to automatic telephone systems, and more particularly to a private automatic branch exchange (PABX) including a system for providing special routing of service calls in response to the dialing of a single digit code.

It has been common to provide single digit line access in various PABX systems in connection with certain business operations. In particular, such single digit dialing has been used in hotels and motels to simplify the means by which a guest may contact the various special services provided for guests in that facility. In this regard, labels are commonly fixed to the telephone subset opposite the various numbers on the dial, to thereby clearly indicate to the guest that a particular special service, such as maid service, room service, swimming pool, dining room, and the like, can be contacted simply by dialing the particular digit identified by a respective label.

However, in a large complex of buildings, wherein each building may have its own special services, it is desirable to insure that an occupant of one building attempting to contact a special service by dialing a single digit will be automatically routed to the special service in his building, rather than one in one of the other buildings. Of course, this can be accomplished by assigning to each of the special services a different multidigit number so that an occupant of one building, for example, a guest in a multi-building motel or hotel, will use only those numbers which apply to the services located in his particular building. The disadvantage in such a solution resides in the requirement that the guests dial a multi-digit number as opposed to the more simplified dialing of a single digit.

In accordance with the present invention, single digit line access is provided with special routing to selective service centers determined by the location of the calling party. In this way, regardless of the location of the calling party, the same digit is dialed to contact a given special service, but the system automatically restricts the routing of that call to the special service center located in the area assigned to the calling party.

In a typical hotel or motel complex, two basic types of special services are provided and these services can be designated as area services or functions and common services or functions. The area services or functions denote services which are located in more than one location and therefore require a special routing depending upon the location of the calling line. Such services are, for example, maid services, which may be provided as separate centers on each floor of a multistory hotel or motel or as a special center located in each building of a multi-building complex. Room service and other similar services would also fall into this category. The common services or functions denote services which are located at a single location within the facility so that the dialing of a single digit assigned to the common service or function will result in connection to the same line regardless of where the calling line is located. For example, a common service may be a swimming pool or dining room, of which only a single facility is provided for the multi-story building or multibuilding complex.

An important consideration in telephone systems providing single digit line access with special routing, as discussed above, relates to the ability of administrative personnel to contact selected service centers within the facility. Ordinarily, an administrator is not so interested in contacting a service center as he is in contacting a particular individual at a particular service center. Thus, if an administrator located in one particular building desires to contact an employee located in a service center assigned to another building, means must be provided within the exchange to prevent automatic connection of the administrative phone to the same area located service center in accordance with the special single digit code which is dialed. In accordance with the present invention, the manner in which single digit line access is provided makes it possible to restrict this special function to phones other than administrative phones, so that calls from administrative phones to service centers require the dialing of the full multi-digit number of that service center.

In accordance with the present invention, as applied to a hotel or motel complex, for example, when a guest dials a single digit representing a special service, the dialed digit is retained in the system as the thousands digit of the service number and designates the particular service which is sought. By providing appropriate class of service strapping on a program panel, the single dialed digit also generates a second digit which serves as the hundreds digit which designates the particular location or building of the service center assigned to the calling party based upon the calling party's class of service. The units and tens digit for all special service centers are identical, which digits are generated within the system. In the case of common services or functions, the dialed digit will serve as the thousands digit, similar to the area service routing, and the hundreds, tens and units digits, being identical for all common services, will be provided by appropriate strapping within the system.

In the case of administrative phones, no class of service for this feature will be provided so that upon dialing a digit designating a particular special area service, no hundreds digit will be automatically generated as in the case of a guest phone. Thus, the system will wait until additional digits are dialed by the administrative party and the call will be processed in the normal manner in connection with the digits which are dialed.

Another feature of the present invention is derived from the assignment to normal guest stations of a class of service utilized in connection with routing for special service calls. It is often desirable after a certain hour in the evening to prevent calls to the guest rooms. Calls coming from outside of the system are automatically routed to the PABX attendant, so that, if a guest does not wish to be disturbed after a certain hour, calls from the outside to his room can be blocked by the attendant. However, since calls from within the facility between guests do not pass through the attendant, it is desirable to provide some means within the system for preventing the establishment of such calls after a certain hour in the evening. In accordance with the present invention, a call-blocking situation can be initiated by the attendant so that calls from within the system to a line circuit having a class of service which indicates that it is a guest phone, rather than an administrative or a service phone, can be blocked automatically within the system.

It is an object of the present invention to provide a PABX system providing single digit line access for special services with routing dependent upon the calling party's location.

It is a further object of the present invention to provide a system of the type described which permits the connection of certain special administrative phones to any selected one of the special service lines regardless of the presence of the special routing feature.

It is still another object of the present invention to provide a system of the type described which is capable of providing routing for both area services and common services in an automatic manner.

It is still a further object of the present invention to provide a system of the type described which utilizes the functioning of the special routing feature to effect call-blocking on a selective basis.

It is another object of the present invention to provide a system of the type described which is extremely simple, and yet is very flexible in its application to facilities of different sizes which have different requirements for service routing.

These and other objects, features and advantages of the present invention will become more apparent from the following detailed description when taken in conjunction with the accompanying drawings, which illustrate one embodiment of the present invention, and wherein.

FIGS. 4–7, when combined, provide a schematic circuit diagram of the special routing circuit of the present invention.

The principles of the present invention are described in detail below in association with an exemplary PBX telephone system of the common control type. Since the present invention is not restricted to use in association with this or any one other particular telephone system, it should be understood that the specific telephone system described herein is presented only for purposes of facilitating an understanding of the basic principles of the invention. Accordingly, only those detailed features of the disclosed common control telephone system which are important to the operation of the present invention have been described in detail.

GENERAL SYSTEM DESCRIPTION

Figure 1:
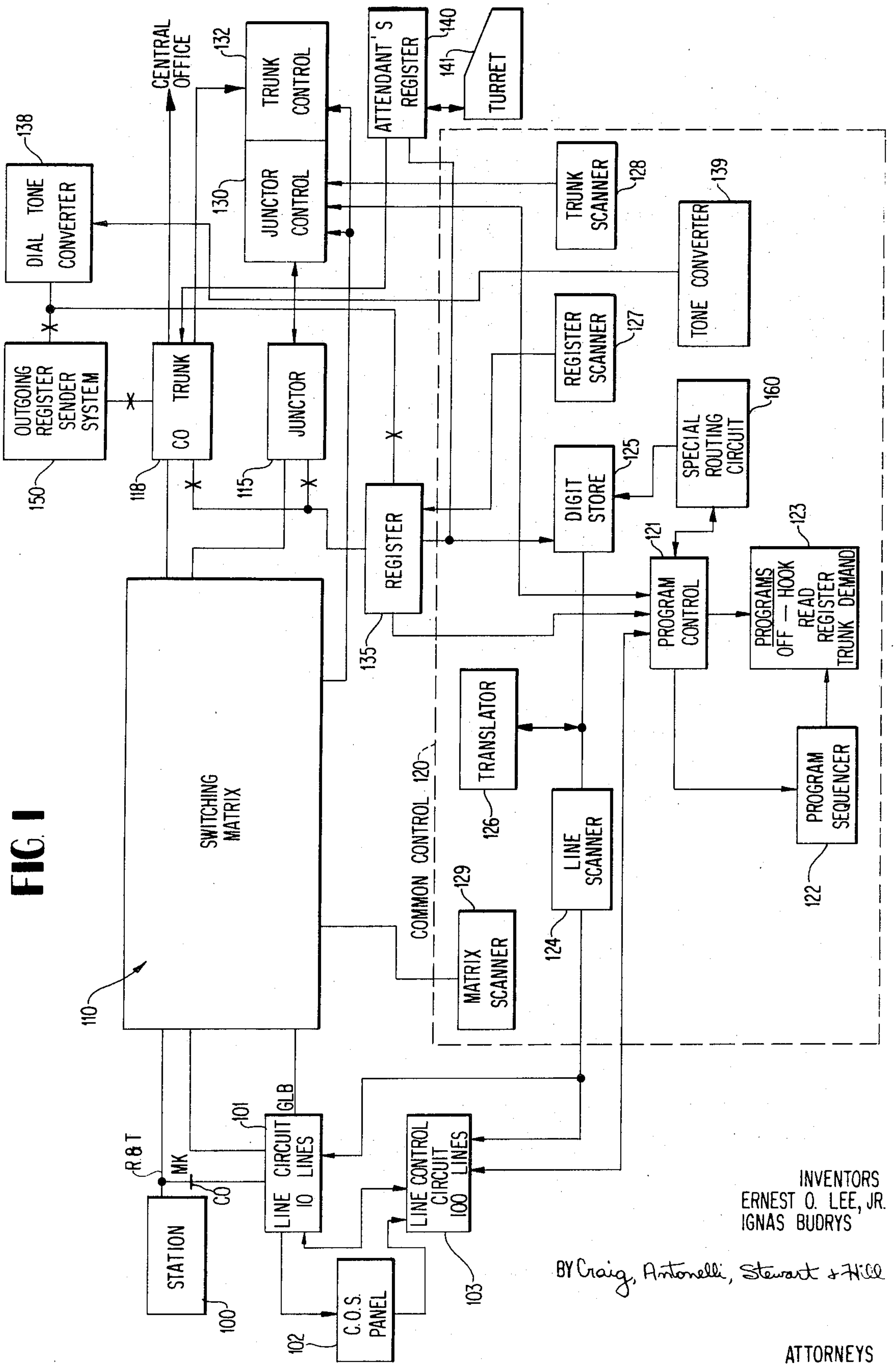
FIG. 1 is a schematic block diagram of a private automatic branch exchange embodying the present invention.

FIG. 1 illustrates an overall block diagram of a common control PBX system capable of connecting one station to another station or to the central office via a trunk circuit under control of the common control circuits. The system provides a plurality of stations 100 (of which only a single station is illustrated in FIG. 1 for purposes of simplicity) with each group of ten stations 100 being serviced by a line circuit 101 associated with a particular input of the switching matrix 110. The switching matrix 110 is a typical matrix network formed of three stages of reed relay switches providing a plurality of paths between a given input connected to one of the plurality of stations 100 and a given output connectable to a junctor 115 or central office trunk 118. All of the switching functions of the system are controlled by the common control circuits 120 which perform the functions for an offhook program, a read register program and a trunk demand program. One or more junctor controls 120 and trunk controls 132 along with a plurality of registers 135 are also provided for purposes of effecting connection of a particular station requiring service to the common control equipment so that the operations necessary to the establishment of a communication connection within the PBX or outside thereof to the central office may be performed. A class of service panel 102 is provided for each group of 100 lines and indicates for the respective stations served by the line circuit special classes of service which are available for the stations and particular equipment which may be available or used thereby, such as tone-dial equipment as opposed to rotary dial.

The common control 120 is divided into several separate functional circuits which serve to control the program of operation carried out to perform the switching processes including the path-checking and selection required for connection of a station requesting service to a register or central office trunk. A line control circuit 103 accommodating 10 line circuits 101 serves as an interface between the common control 120 and the individual line circuits 101. The common control 120 typically includes a program control 121 which selects the program to be run to satisfy the request for service and a program sequencer 122 and a program circuit 123, which implement the program selected by the program control 121. The program control 121, program sequencer 122 and program circuit 123 may typically take the form of a wired logic or other programmed system of the type well known in the art. The various control signals eminating from this program control area of the common control 120 have not been illustrated in detail since the arrangement and functioning of such elements do not directly relate to the present invention and such systems are conventionally provided in several forms in the known prior art.

The common control 120 also includes a line scanner 124 which determines the line demanding service on an originating call and identifies and acts as a line marker when terminating a call. A digit store 125 and a translator 126 are also provided and serve the functions normally associated with such elements, the digit store 125 being associated with the special routing circuit 160 which forms the substance of the present invention. A register scanner 127 examines the status of the registers and register senders to determine if an idle register or outgoing register sender is available for use in connection with a calling station or to find the register demanding service to complete a call. A trunk scanner 128 and matrix scanner 129 are associated with the path-selecting and checking operation performed in connection with the switching matrix 110, the trunk scanner 128 serving to scan the junctors 115 and central office trunks 118 through the junctor control 130 or trunk control 132 to determine those which may be available to a calling station through the switching station 110. The matrix scanner 129 serves to scan the links in the switching matrix 110 in the process of establishing a path from a given calling station through the switching matrix, in accordance with a system disclosed in co-pending application Ser. No. 37,772, filed May 15, 1970, in the name of Ernest O. Lee, Jr., now U.S. Pat. No. 3,660,600, and assigned to the same assignee as the present application. This co-pending application also includes a detailed description and illustration of the switching matrix 110 and the various elements including the junctor control 130 and trunk control 132 along with the other elements required for the path-finding operation.

In order to provide attendant service in the system, an attendant's register 140 and turret 141 are connected to the central office trunks 118 and registers 135 to provide service for incoming and outgoing calls. Also associated with the central office trunks 118 is an outgoing register sender system 150, such as disclosed in co-pending application Ser. No. 57,550, filed July 23, 1970, in the name of Ernest O. Lee, Jr. and John A. Adams, Jr., and assigned to the same assignee as the present application.

Typical operation of the system of FIG. 1 is initiated by a subscriber at a given station 100 lifting the hand set of his telephone, which results in a closing of a direct current loop to the tip T and ring R leads of the line thereby signaling the associated line circuit 101 of the demand for service. The demand is placed through the associated line control circuit 103 to the common control 120 for an offhook program, and the common control causes the line scanner 124 to scan over the lines to identify the particular line requesting service.

The common control 120 causes the line circuit 101 to place a negative potential mark on its mark lead, which is connected to an input of the switching matrix 110. The common control 120 then actuates the matrix scanner 129 initiating the path-checking and selecting operation which will select a single path through the switching matrix 110 from the station 100 requesting service. The common control also causes the trunk scanner to scan over the junctors, through the junctor control, for an idle junctor and the register scanner to select an idle register. The cross points of the selected matrix path are operated at this time connecting the calling line through the junctor to the selected register. Dial tone is returned to the calling line from the register through the switching matrix, and at this time, the common control releases and is available to handle other requests for service.

After receiving dial tone, the subscriber dials one or more digits which are received and stored in the register. The common control analyzes the dialed digits as they are received to determine whether the call to be established is a local call, an outgoing trunk call or a special service call. If the dialed digits represent a local call within the system, the register calls in the common control for service. The common control starts the register scanner 127 scanning for the register requesting service. When the register has been found, the digits which have been stored in the register are passed to the digit store 125 in the common control. The digit store passes this information to the line scanner 124 which marks the desired line and the line is checked to see if it is idle or busy. If the line is idle, the common control calls in the matrix scanner to establish a path from the junctor to the called line. The path through the switching matrix is closed and ringing is applied to the respective lines from the junctor. The common control then releases, making it available to serve other requests for service.

In the case of a special service call, wherein the first digit dialed designates a particular area or common service, such as room service, maid service, swimming pool or dining room in a hotel or motel facility, a check of the first digit stored in the digit store 125 by the program control 121 will detect the special significance of the dialed digit. In the normal course of operation of the exchange, the first dialed digit is always checked to see if the call is to be local or a trunk call, in which case the common control either releases until a full local number is dialed or transfers the digit to the outgoing register sender system and releases to allow that system to further handle the call. At the same time the first digit is also checked to see if it is strapped in a program panel to represent a special service digit.

If the first digit dialed is a special service digit, the special routing circuit is required to generate three additional digits in the case of a common service call, which digits are applied to the digit store to complete the line number of the service facility requested. In the case of an area service digit, a signal is forwarded from the special routing circuit 160 through the calling line circuit via the line control 103 to the COS panel 102 to determine the class of service relating to this feature. The class of service indication will be applied via the program panel which is strapped to route the class of service indication to the special routing circuit 160. This class of service generates the hundreds digit based on the calling line's location.

The special service routing circuit will generate two additional digits necessary along with the dialed digit and the digit generated by the class of service panel to designate the particular service center assigned to the calling subscriber which provides the services that he is requesting. The three digits which are provided in the special service routing circuit are forwarded to the digit store where they are stored along with the dialed digit. The completion of the call from the calling subscriber to the special service location designated by the four digits stored in the digit store is then carried out in the normal manner, as described above.

In the case of call blocking, the attendant actuates a key at the attendant console which generates a control signal capable of inhibiting the operation of the program control to establish a call to a line circuit. This control signal is applied to a gating arrangement in the special service routing circuit, which gating arrangement will pass the control signal for all calls to a line circuit having a special class of service designation utilized for the special service routing feature. In other words, when a multi-digit number has been dialed, the common control checks through the COS panel 102 to determine whether a class of service is provided for that particular called line circuit. If a class of service is provided, a digit in binary form is generated in the class of service panel and is automatically applied to the special service routing circuit which enables a special gating arrangement therein to pass the control signal from the attendant console inhibiting the further processing of that call by the common control. A busy tone is then returned to the calling party from the junctor and the common control releases.

SPECIAL SERVICE ROUTING CIRCUIT

Each line circuit is provided with seven possible service location codes which are programmed in binary coded decimal form on the class of service panel COS 102 and via the program panel routed to the special service routing circuit. For purposes of describing the principles and operation of the present invention, it is assumed that a four digit PABX system is provided for a three-building motel or hotel complex, as schematically illustrated in connection with FIG. 2. It is further assumed that each building has separate maid and room services and that there is one swimming pool and one dining room. The following digits can be assigned to the various services:

Maid 5

Room Service 6

Dining Room 3 If it is assumed that this motel or hotel has no rooms in the 9 tens group, i.e., the rooms are numbered 100–189, 200–289, 300–389, etc., the tens digit of 9 may be chosen for service line numbers so that any four-digit number including a 9 as the tens digit must certainly be a service number. Any units digit may be used in the four number system, for example, three. Since the area service lines require a special routing depending upon the location of the calling line circuit, the hundreds digit of the four-digit number designating a service center will be selected to designate the particular service center, such as maid service or room service, assigned to the particular calling subscriber. For purposes of this example, the digits 2, 5 and 7 have been chosen for the respective buildings of the motel or hotel. Thus, with the foregoing choices made, the area service lines are designated in this example as follows:

Maid Service 5293, 5593, 5793

Room Service 6293, 6593, 6793

Figure 2:
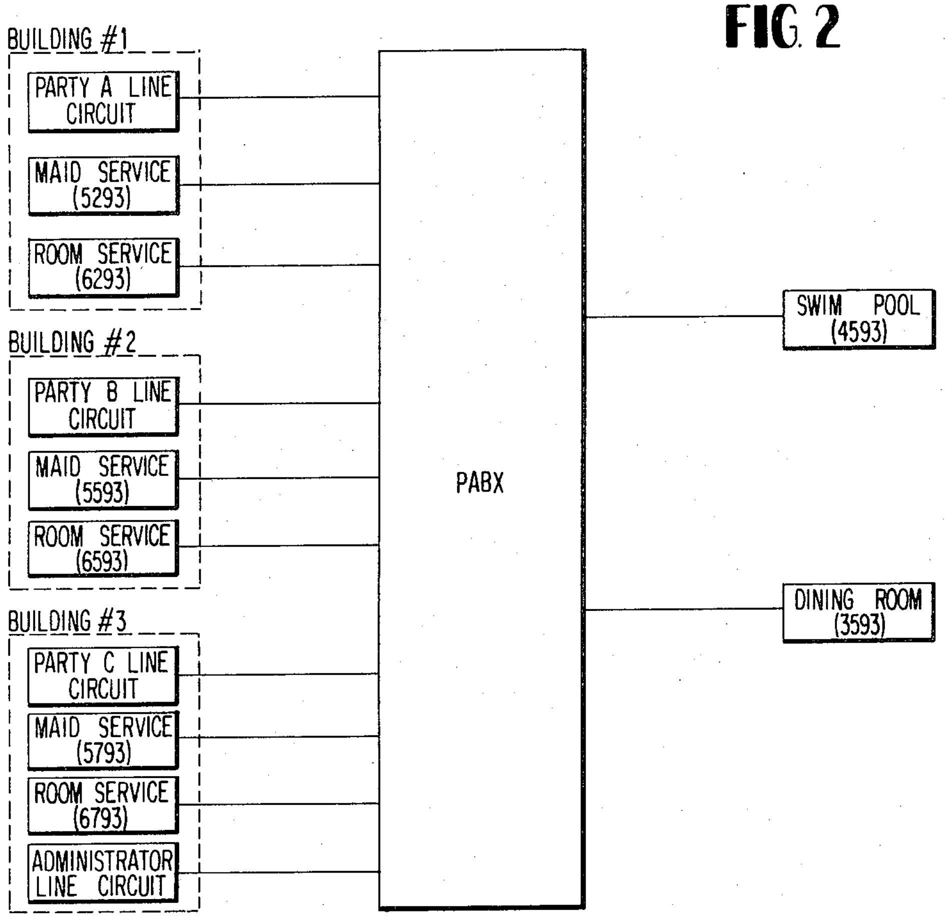
FIG. 2 is a schematic diagram illustrating the principles of the present invention.

As can be seen in FIG. 2, the maid service and room service in each of the three buildings associated with the PABX has a different four-digit number, with the first or thousands digit designating the particular service, the second or hundreds digit designating the location or building in which the service is located, the tens digit designating that the number is a service number, and the units digit being a number which is arbitrarily chosen.

The dining room and swimming pool are common services; thus, no matter what the location of the calling line, the same line has to be reached. Accordingly, only the thousands digit need be distinctive since a routing to a particular location dependent upon the location of the calling party is not necessary. For purposes of this example, the digits 3 and 4 have been assigned for the dining room and swimming pool, respectively, and the common control is programmed to recognize these digits. The tens and units digits have already been selected since they are common for both area service and common service lines, and so only a hundreds digit need be selected for the common service lines. This is accomplished in the special service routing circuit by strapping, as will be described in greater detail hereinafter. Thus, the line numbers for the dining room and swimming pool are as follows:

Dining Room 3593,

Swimming Pool 4593.

All of the numbers for the various area service and common service lines for the three buildings of the complex assumed for purposes of example in connection with the PABX system are illustrated in FIG. 2. The main feature of the present invention, as already indicated, is to permit a party to establish a communication with one of the area service or common service lines by dialing only a single digit representative of the particular service desired. For example, by dialing the digit 5, communication will be established with the maid service; however, depending upon which building the party is occupying the PABX system will automatically add to the digit 5 three digits corresponding to the particular maid service assigned to and located in the building occupied by the calling party. As seen in FIG. 2, if party A desires maid service, he will dial the digit 5 and the system will automatically add the digits 293 to that to insure that the communication connection will be to the maid service in building 1 rather than to the maid service in buildings 2 or 3. The same is true for room service, which may be contacted by the party B in building 2 by dialing the digit 6, to which is added by the system the digits 593, insuring that party B will contact the room service in building 2 rather than the room service in buildings 1 or 3. As will be described in greater detail below, an administrator line circuit, such as provided for example in building 3, may contact any of the service centers in any of the buildings by dialing the four digits identifying the particular service line. Contrary to the operation in connection with the normal line circuit, the administrator line circuit does not have the special service routing feature available to it since no special class of service designation is assigned to these line circuits.

Figure 3:
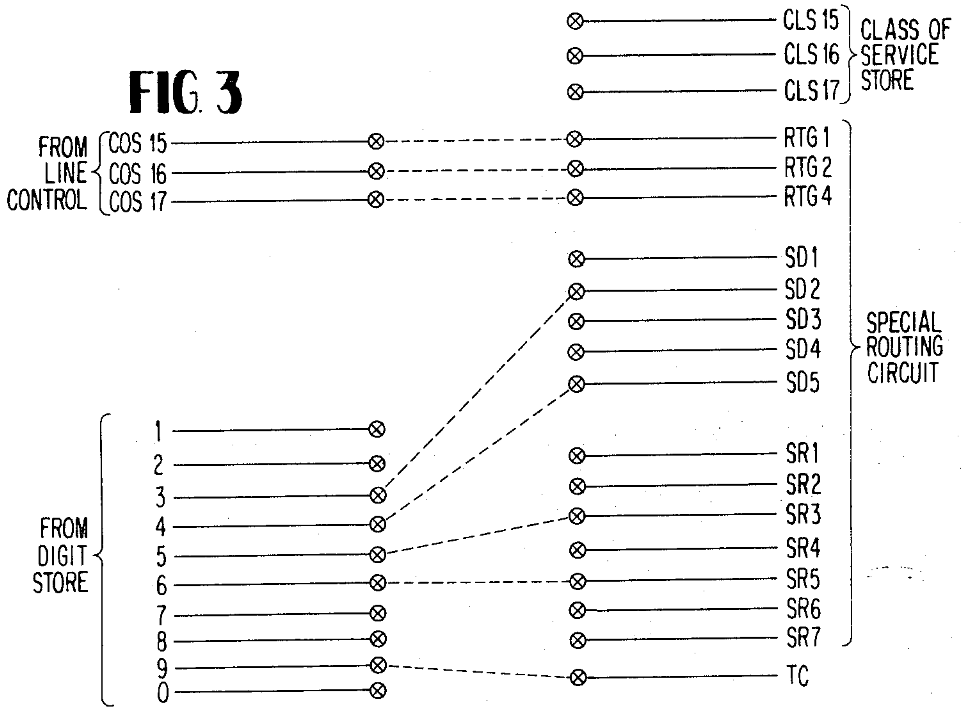
FIG. 3 is a diagram illustrating a portion of a program panel.

A portion of the program panel in the program control 121 is illustrated in FIG. 3. A plurality of lines 0 through 9 extend from the digit store and are selectively enabled in response to receipt in the digit store of a first digit corresponding to the numerical designation of the line. These lines may be selectively strapped to outgoing control lines as a means of detecting special digits and initiating the proper sequence of control functions in response thereto. For example, where the digit 9 is used to designate a trunk call, the terminal 9 from the digit store may be strapped to the line TC which extends to the trunk control 132 and other control circuits to set up a trunk call. In the same manner, the digits 5 and 6 which designate routed area service calls are strapped to one of the lines SR1–SR7, and the digits 3 and 4 which designate non-routed common service calls are strapped to one of the lines SD1–SD5.

The class of service lines COS15–COS17 extend from the COS panel 102 through the line control to the program panel. When the system is equipped with a special service routing circuit, the COS terminals on the panel are strapped to corresponding RTG terminals, i.e., COS15 to RTG1, COS16 to RTG2 and COS17 to RTG4. If a special routing circuit is not provided, the COS terminals are strapped to corresponding CLS terminals.

The hundreds digit corresponding to the location of the calling party is generated by inserting the proper class of service plugs in the COS panel. Thus, for party A a plug in COS16 would be inserted identifying digit 2. For party B plugs in COS15 and 17 would be needed to generate a hundreds digits 5. As is seen from this, the COS15 corresponds to binary 1, COS16 to binary 2 and COS17 to binary 4. By inserting from one to three plugs, a binary coded decimal number can be generated having any value from one to seven. This number is routed from leads RTG to the special service routing circuit where it is stored and eventually used as a hundreds digit.

The special service routing circuit is illustrated in detial in connection with FIGS. 4 through 7. If the first dialed digit indicates that the call is a local call within the system, the common control will normally disconnect and wait until a units digit has been received, which indicates that all dialed digits designating the called line circuit have been received. However, as already indicated, the digits which have been assigned to the various service centers, such as the digits 3, 4, 5, and 6 in the foregoing example, are strapped on a program panel in the common control 120, so that upon receipt of one of these digits, ground is provided on one of the lines SR1 through SR7 representing respective ones of these digits which have been assigned to the available area services. The leads SR1–SR7 are applied to a pair of OR gates G10 and G11 so that a ground on one of these input leads will provide a high (+5v) at the output of gate G11. This high is applied to gate G12 which provides a ground on lead SSD to the program control indicating that only a single digit will be dialed and therefore the common control should maintain its connection with the register even though the call is a local call.

Figure 4:
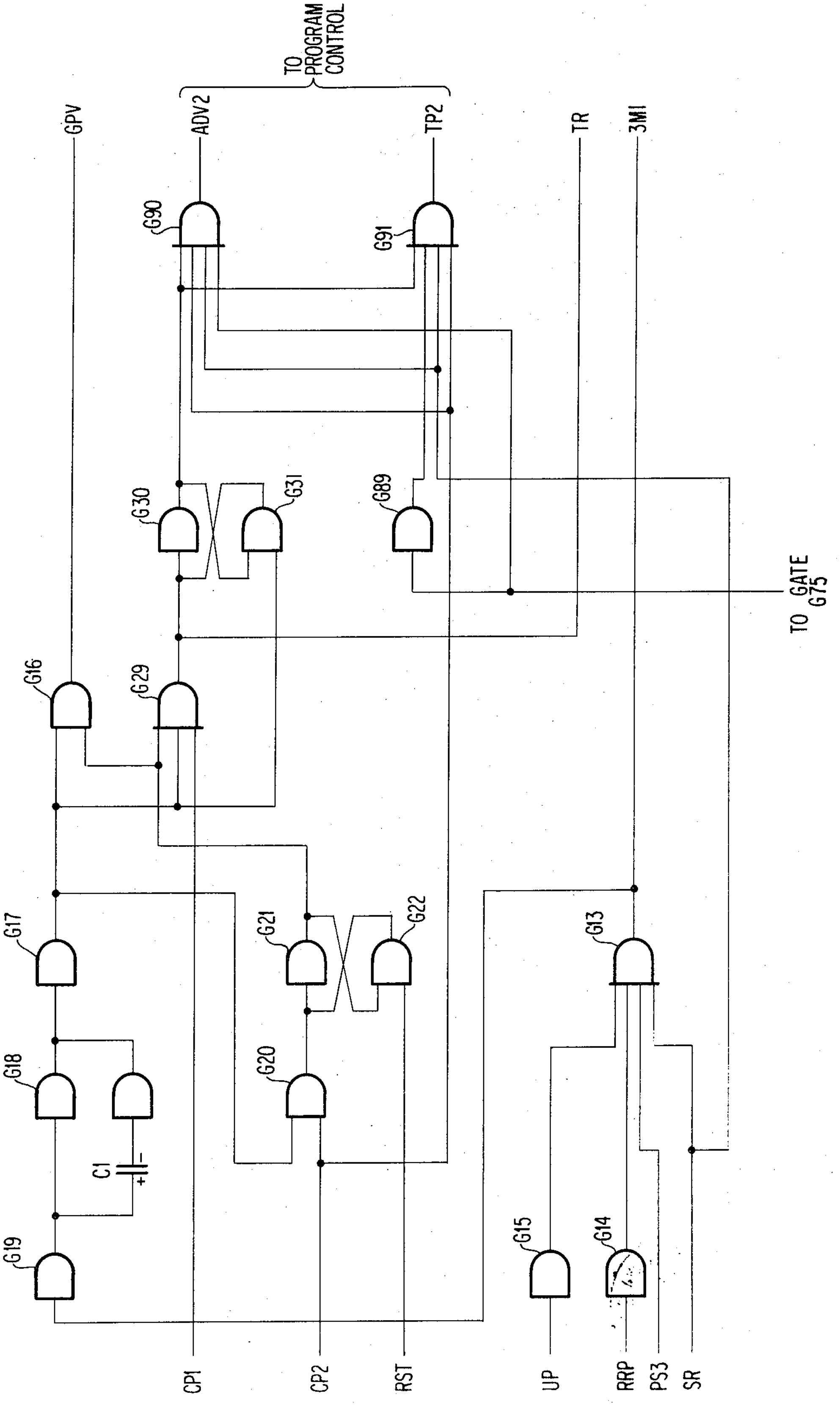
Figure 5:
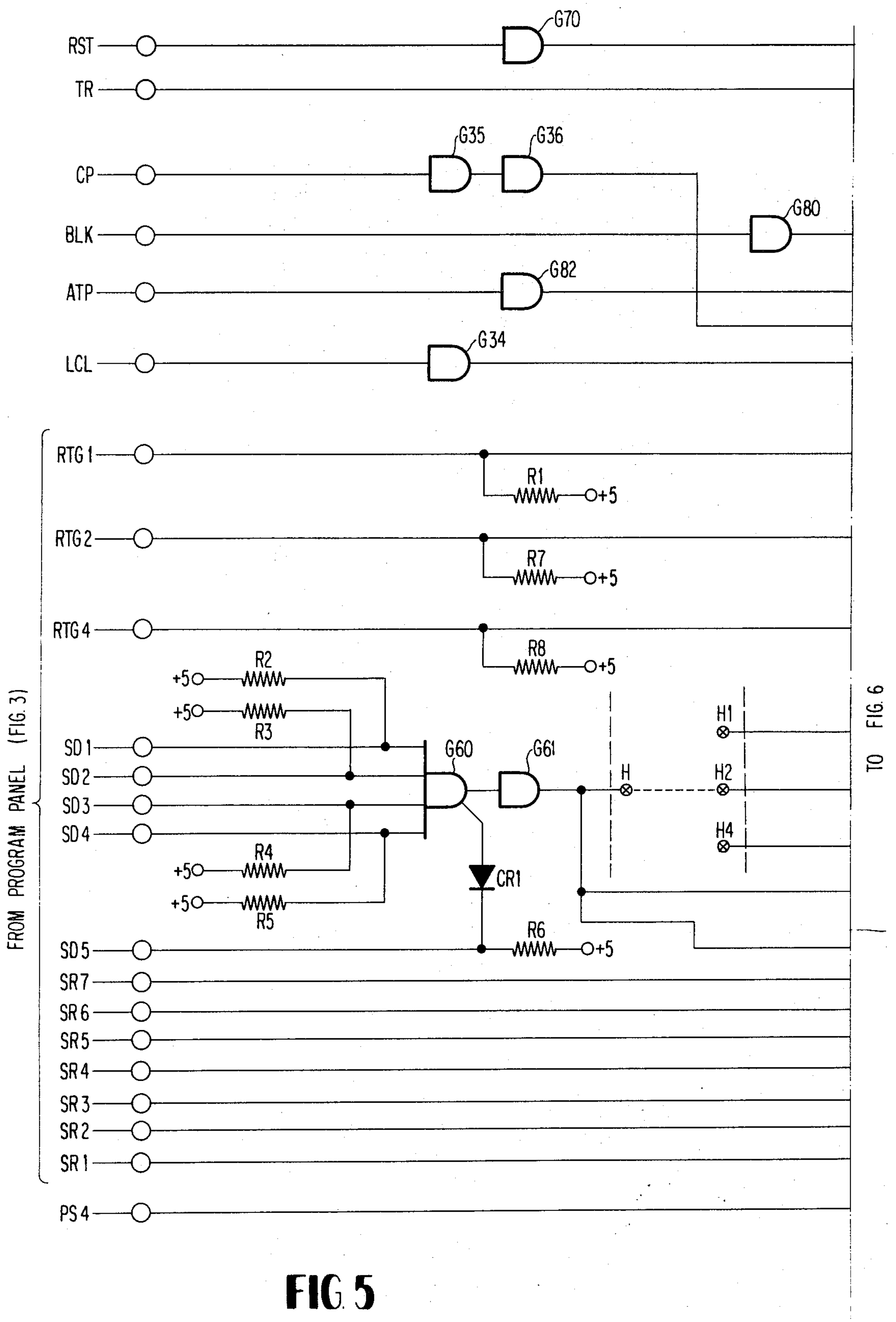
Figure 6:
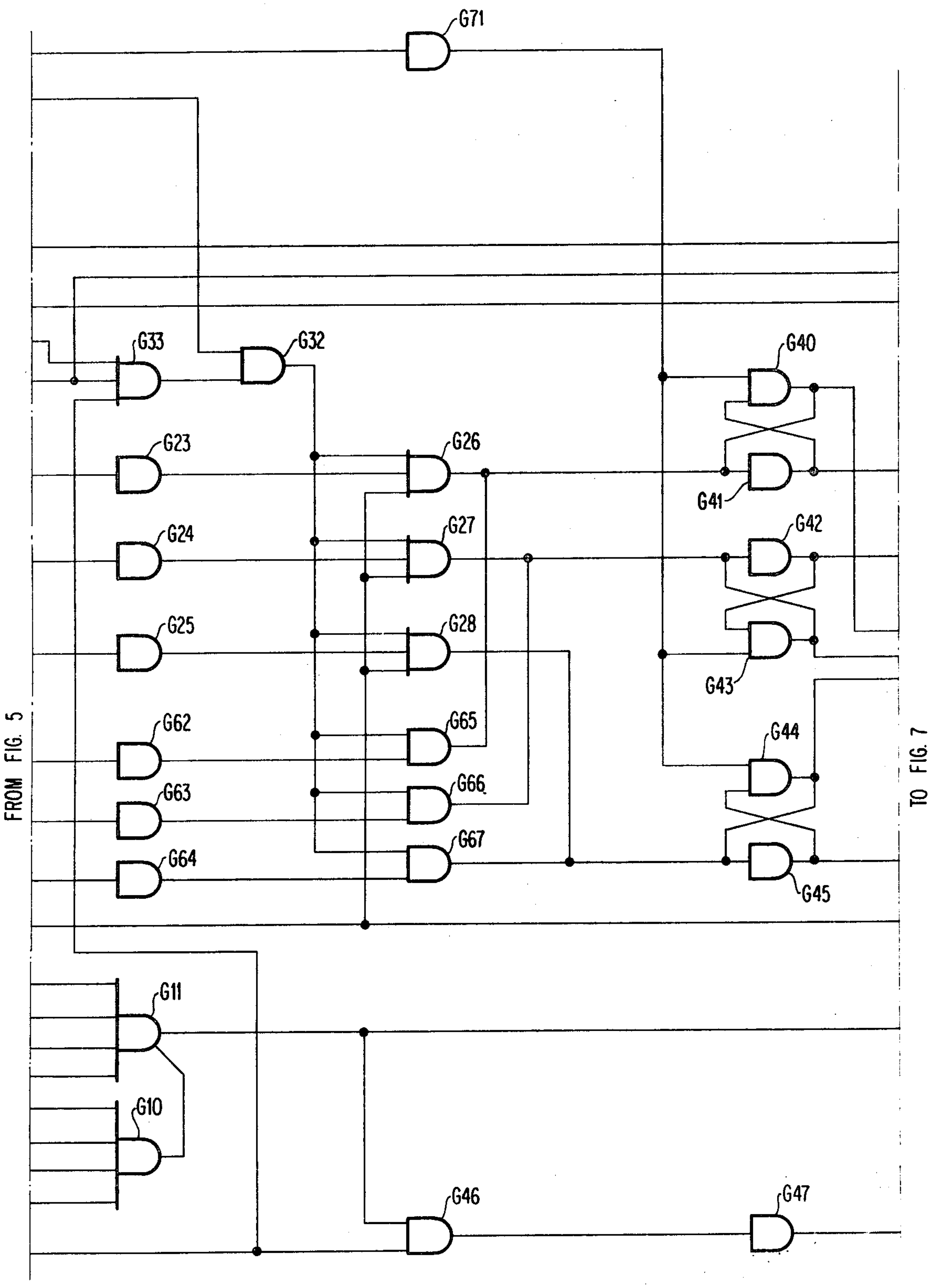

The high at the output of gate G11 is also applied via line SR to a gate G13 in FIG. 4. Also applied to the gate G13 is a high from the output of gate G14 as a result of ground on the lead RRP from the program control, indicating that a read register program is being run. Another high at the output of gate G15 as a result of ground on lead UP is applied to the gate G13 indicating that the units position in the digit register has not been filled (only one digit has been dialed). At program step 3 of the read register program, a high is provided on lead PS3 to the gate G13 enabling the gate and thereby providing a ground at the output thereof on lead 3MI to the program control providing an inhibit of the read register program. This period during which the read register program is inhibited permits the generation of the additional pulses in the special service routing circuit before the program continues with the setting up of a connection from the calling line circuit to the called line circuit. Obviously, since only a single digit is present in the digit store, the program for establishing connection between a calling subscriber and a called subscriber could not be successfully completed unless the additional digits necessary to identify the called line circuit are provided. This is done during the interval in the program provided by the output of gate G13.

The high at the output of gate G13 is also applied to the input of gate G17 via gates G18 and G19 with a 3 millisecond delay provided by capacitor $C_1$ to provide for circuit connections. The output of gate G17 enables one input of gate G16 and also enables gate G20 to permit a clockpulse from lead CP2 to set the flip-flop formed by gates G21 and G22. The output of gate G21 is provided to the other input of gate G16 placing ground on lead GPV which generates a positive voltage signal to the calling line circuit through the junctor and line control circuit. This positive voltage is extended from the calling line circuit to the class of service panel 102, and if the calling line has a class of service relating to this feature, the programmed binary coded decimal number will be extended from the COS panel, via the program panel illustrated in FIG. 3, to the special service routing circuit. These digits in binary form are applied to the special service routing circuit on leads RTG1, RTG2 and RTG4 in FIG. 5. A predetermined time later CP1 sets flip-flop G30–G31 via gate G29.

The binary designation received on lines RTG1–RTG4 is applied through inverters G23, G24, and G25 to gates G26, G27 and G28. The output from gate G29 (FIG. 4) will also be applied on line TR to enable one input of gate G32 in FIG. 6. At program step 4 lead PS4 (FIG. 5) goes high (+5v), which high is applied to one input of gate G33 in FIG. 6. A ground is also applied on lead LCL upon identification that the digit in the digit store represents a local call so that a high is provided at the output of gate G34 to a second input of the gate G33. Thus, a clock pulse from lead CP is applied through the gates G35, G36, and G33 to enable the gate G32. This enables gate G26, G27 and G28 to connect the lines RTG1–RTG4 to the three flip-flops formed by gates G40–G45. The high on lead PS4 also enables the gates G48, G49 and G50 connected to the outputs of the three flip-flops formed by gates G40–G45 via gates G46 and G47. Thus, the binary designation of the hundreds digit is applied to leads NH1, NH2 and NH4 to the digit store.

Figure 7:
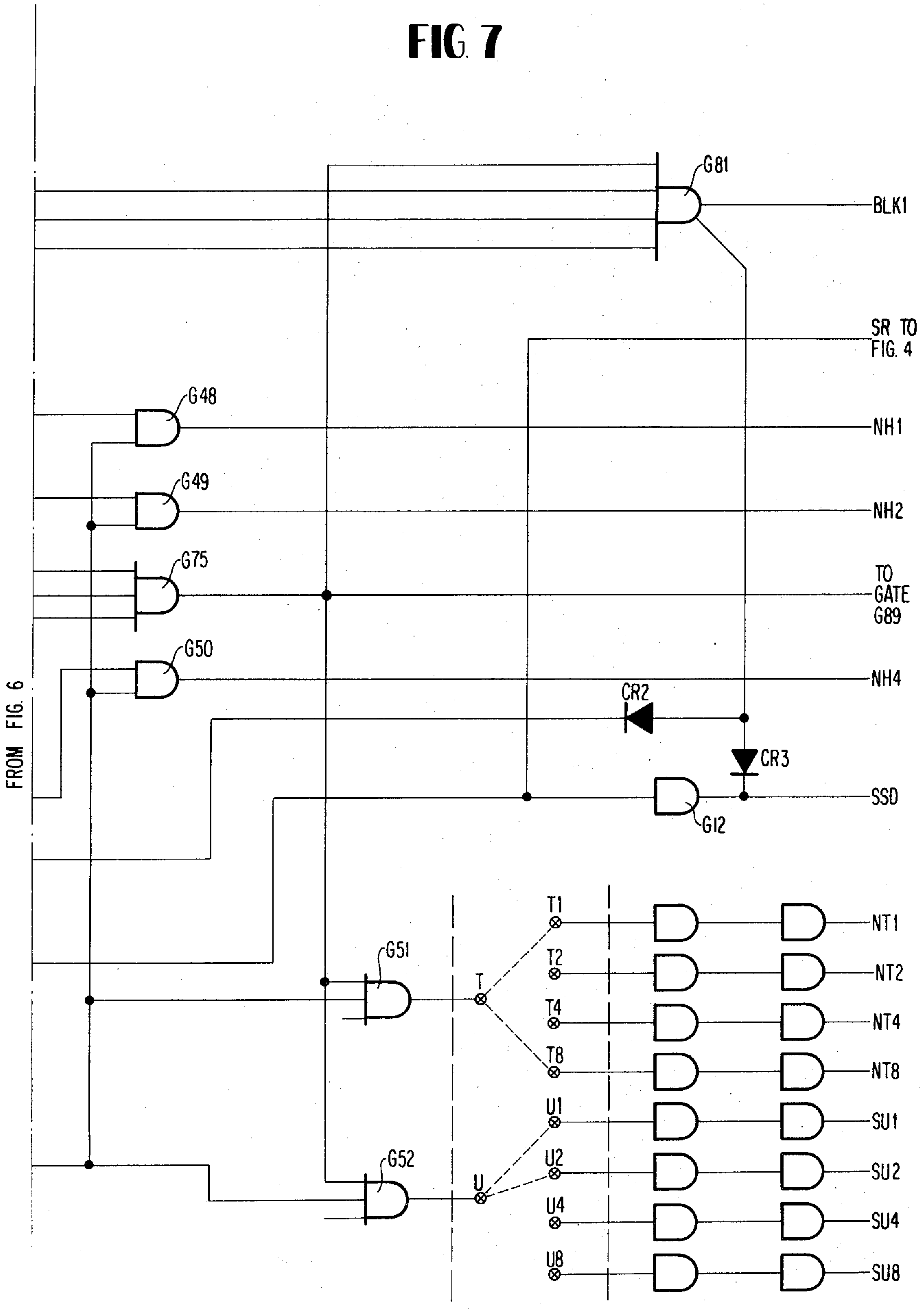

As indicated above, for all service calls, whether they be area service calls or common service calls, the same tens and units digits are utilized. These digits are provided by a number forming means including a strapping panel, as seen in FIG. 7, wherein the terminal T is selectively connected to one or more of the terminals T1, T2, T4 and T8 to provide a binary designation of the digit to form the tens digit of the number. In the same manner, a terminal U can be selectively strapped to any one or more of the terminals U1, U2, U4 and U8 to provide a binary output representing the units digit of the number. The gates G51 and G52 are enabled from the output of gate G47 at the same time that gates G48–G50 are enabled so that the hundreds, tens, and units digits are simultaneously transferred to the digit store. The tens digit is provided on output leads NT1, NT2, NT4 and NT8. The units digit is provided at the output leads SU1, SU2, SU4 and SU8.

If the digit dialed by the calling subscriber represents a common service rather than an area service, routing is unnecessary. Thus, a check of the COS panel 102 to obtain a class of service designation is unnecessary. Accordingly, none of the leads SR1–SR7 will receive a ground input, but instead a ground will be applied on one of the leads SD1–SD5, which are reserved for common service digits. The ground input on one of these leads will be applied through gates G60 and G61 to the output line SSD to inform the program control that, while the call is a local call, the control must remain in connection with the register for purposes of processing a single digit special service call.

Also, the output of gate G61 is routed to the input of gate G11 starting the sequence outlined above for an area service line. The output from gate G61 is also applied to a terminal H which is strapped to one or more of the terminals H1, H2 and H4 to provide a binary designation representing the hundreds digit which has been assigned to the common service calls. This binary designation is applied through inverters G62, G63, and G64 to gates G65, G66 and G67. As indicated above, upon enabling of gate G32, the outputs of gates G65, G66 and G67 will be applied to the three flip-flops formed by gates G40–G45. The hundreds digit stored in these flip-flops is then gated through gates G48, G49 and G50 to leads NH1, NH2 and NH4 to the digit store, along with the tens and units digits in the manner already described.

Thus, in the case of an area service call where routing is required, the class of service designation is applied through a cos panel wherein proper cos plugs produce a binary indication of the hundreds digit which is transferred through the program panel and special service routing circuit to the digit store along with the tens and units digits which are generated within the special service routing circuit from a strapping panel therein. In the case of common service calls, the hundreds digit being identical for all calls, this digit can be generated by appropriate strapping within the special service routing circuit rather than requiring a class of service designation. Thus, the thousands digit of the line number if formed by the original digit dialed by the calling party, the hundreds digit on a routed call is generated from the calling party's class of service designation and is provided as a fixed digit designated by a strapping panel in the special service routing circuit for common service calls, and the tens and units digits are always the same, being provided by strapping within the special service routing circuit. When the four digits are stored in the digit store, the reset signal RST can be applied from the program control through gates G70 and G71 to rest all of the flip-flops.

In the case of a line circuit assigned for administrative purposes, no class of service designation is provided, so that if such a line circuit generates a service digit which would ordinarily require special routing, the application of the positive voltage signal GPV to the line circuit will not result in the class of service designation necessary to generate a binary combination on the input leads RTG1, RTG2 and RTG4. Thus, no hundreds digit will be generated by the special service routing circuit. To also prevent the application to the digit store of the tens and units digit generated in the special serving routing circuit, an output is provided from a gate G75 having inputs connected to each of the flip-flops formed by gates G40–G45. The output of gate G75 is applied to inhibit gates G51 and G52 so that at program step 4, no output will be provided on leads NT1–NT8 and SU1–SU8. On common service calls, since no routing is required, single digit line access is available to the administrative line circuit, in the manner described above.

Since the output of gate G75 connected to the three flip-flops which store the binary designation corresponding to the class of service designation of the calling party indicates whether the party has a class of service, this output can be used to indicate whether a line circuit is a standard line circuit or is a service or administrative line circuit. If the output from gate G75 indicates that no class or service designation has been generated, then the line circuit in question must be either an administrative or a service line. For purposes of effecting a blocking of calls between parties within the system, the attendant can by actuating a switch at the attendant's console place ground on lead BLK (FIG. 5) which produces a high at the output of gate G80 to one of the inputs of gate G81. If the output from gate G75 to gate G81 indicates that the called party has a class of service designation and therefore is a guest room, a high is provided at the output of gate G80 to another input of gate G81 indicating that a call-blocking situation is required. If the output of gate G34 to gate G81 indicates that the call is a local call, an output will be provided on line BLK1 of gate G81 indicating to the program control that the program should be abandoned and the call blocked. An override on the call-blocking situation can be accomplished by the attendant, since establishment of a call by the attendant will provide an output from gate G82 as a result of a high on lead ATP effectively inhibiting gate G81 to override the blocking condition.

Looking once again to FIG. 4, a gate G90 provides an output ADV2 to the program control for advancing the program after the special service routing has been accomplished provided a proper call of service designation has been detected at the output of gate G75. If a proper class of service designation is not provided at the output of gate G75, gate G91 will be enabled to provide an output on line TP2 to the program control which terminates the program and prevents further processing of the call. The gates G90 and G91 serve to provide a control in the case of the dialing of a special service digit requiring a routing of the call since enabling of the gates requires a proper output from the gate G11 to which the inputs SR1–SR7 are connected.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In an automatic telephone system including at least first and second groups of line circuits, each group including a plurality of subscriber line circuits and at least one service line circuit, said subscriber line circuits being identified by individual multi-digit members and said service line circuits being identified by individual multi-digit numbers having a common first digit, class of service designating means for providing a class of service indication only in connection with said subscriber line circuits, connection means for interconnecting telephone lines, and common control means responsive to multi-digit signals received from a calling line circuit for actuating said connecting means to interconnect said calling line circuit and a called line circuit designated by said multi-digit signals, a special routing arrangement for single digit line access to service line circuits comprising routing means responsive to detection of a signal representing said common first digit from a calling line circuit for applying a class of service requesting signal to said class of service designating means through said calling circuit, said class of service designating means including digit generating means responsive to said class of service requesting signal for generating a second digit signal specifically identifying a single service line circuit in the same group as the calling line circuit and applying said second digit signal to said common control means through said routing means, and number forming means for generating additional digit signals forming with said signals designating said first and second digits the multi-digit signals representing the number of said single service line circuit.

2. The combination defined by claim 1, wherein said routing means includes accessing means for accessing said class of service designating means from said calling line circuit in response to detection of said common first digit signal and actuating means responsive to receipt of said second digit signal from said class of service designating means for actuating said common control means.

3. The combination defined in claim 2 wherein said routing means includes storage means for said second digit signal and said number forming means includes strapping panel means responsive to said second digit signal for generating fixed additional digit signals in connection with all service line circuit numbers.

4. The combination defined in claim 2, wherein said digit generating means is provided as a strapping panel wherein a class of service input is provided for each group of line circuits, each class of service input being strapped to a plurality of output lines in an individual binary combination designating the particular group.

5. The combination defined in claim 4, wherein said routing means includes storage means connected to said plurality of output lines from said strapping panel.

6. The combination defined in claim 1, wherein each group of line circuits includes a first service line circuit and a second service line circuit identified by individual multi-digit numbers having different first digits, the second digit of said first service line circuit and the first digit of said second service line circuit being the same in each group, and said system further including at least one additional service line circuit common to all groups of line circuits and having a different first digit from said first and second service line circuits in each group.

7. The combination defined in claim 6, wherein said routing means is responsive to detection of only the signal representing the first digit of said first or second service line circuits in each group for generating said class of service requesting signal and includes additional means responsive to detection of the signal representing the first digit of said additional service line circuit for generating a control signal designating a service call to said additional service line circuit.

8. The combination defined in claim 7, wherein said routing means includes means responsive to said control signal for generating a second digit signal identifying only said additional service line circuit.

9. The combination defined in claim 2 further comprising manually settable means for generating an inhibit signal capable of inhibiting the operation of said common control means in processing a call, and gating means in said actuating means responsive to receipt of a second digit signal from said digit generating means in connection with a called line circuit for applying said inhibit signal to said common control.

10. The combination defined in claim 2, wherein at least one of said subscriber line circuits in one of said first and second groups is not connected to said digit generating means and therefore is not provided with a class of service indication in said class of service designating means.

* * * * *

UNITED STATES PATENT OFFICE
CERTIFICATE OF CORRECTION

PATENT NO. : 3,692,946

DATED : September 19, 1972

INVENTOR(S) : Ignas Budrys and Ernest O. Lee, Jr.

It is certified that error appears in the above-identified patent and that said Letters Patent are hereby corrected as shown below:

| | |
|---|---|
| Col. 7, line 18 | After "3" insert ---Swimming Pool 4--- |
| Col. 11, line 16 | "cos" should read ---COS--- (both occurrences). |
| line 28 | "if" should read ---is---. |
| Col. 12, line 60 | "connecting" should read ---connection---. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*